US012627219B2

(12) United States Patent
Nogawa

(10) Patent No.: US 12,627,219 B2
(45) Date of Patent: May 12, 2026

(54) ADAPTIVE DEAD-TIME CONTROL FOR SWITCHING CIRCUITRY OF A DC CONVERTER

(71) Applicant: Qorvo US, Inc., Greensboro, NC (US)

(72) Inventor: Masashi Nogawa, Sachse, TX (US)

(73) Assignee: Qorvo US, Inc., Greensboro, NC (US)

( * ) Notice: Subject to any disclaimer, the term of this patent is extended or adjusted under 35 U.S.C. 154(b) by 150 days.

(21) Appl. No.: 18/380,774

(22) Filed: Oct. 17, 2023

(65) Prior Publication Data

US 2024/0178746 A1     May 30, 2024

Related U.S. Application Data

(60) Provisional application No. 63/385,332, filed on Nov. 29, 2022.

(51) Int. Cl.
*H02M 3/158*     (2006.01)
*H02M 1/38*      (2007.01)
*H02M 3/157*     (2006.01)

(52) U.S. Cl.
CPC ............. *H02M 1/38* (2013.01); *H02M 3/157* (2013.01); *H02M 3/158* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS 6,934,166 B2     8/2005  Vinciarelli
9,755,519 B1 *   9/2017  Huang ................. H03K 17/687
(Continued)

FOREIGN PATENT DOCUMENTS

EP        4040676 A1     8/2022
WO    2009015205 A1     1/2009

OTHER PUBLICATIONS

Extended European Search Report for European Patent Application No. 23213122.7, mailed Apr. 9, 2024, 10 pages.
(Continued)

*Primary Examiner* — Bryan R Perez
(74) *Attorney, Agent, or Firm* — Withrow & Terranova, P.L.L.C.

(57)          ABSTRACT

Embodiments of a switch converter are disclosed. The switch converter includes switching circuitry with a primary and a secondary switch, an output filter, a high-pass filter, switch control circuitry, and a trigger circuit. The output filter is connected to the switching circuitry. The switch control circuitry controls operation of the primary switch and the secondary switch so that the output filter generates a DC voltage and an enabling signal. The high-pass filter receives a feedback signal and detects a switching event of the switching circuitry with the feedback signal that is generated during a dead time of both the primary switch and the secondary switch are open simultaneously. The transient detector circuit generates a trigger signal in response to the switching event and an enabling signal being in an enabling state. The switching circuitry closes the secondary switch in response to the trigger signal.

20 Claims, 6 Drawing Sheets

(56)                      References Cited

U.S. PATENT DOCUMENTS

|  |  |  |  |
|---|---|---|---|
| 9,823,149 B2 | 11/2017 | Slechta | |
| 10,181,786 B1 | 1/2019 | Hesse et al. | |
| 11,316,441 B2 | 4/2022 | Shah | |
| 2012/0002447 A1* | 1/2012 | Yao ....................... | H02M 3/155 |
| | | | 363/21.1 |
| 2012/0306465 A1* | 12/2012 | Suga .................... | H02M 3/156 |
| | | | 323/282 |
| 2017/0040894 A1 | 2/2017 | MeVay | |
| 2017/0302158 A1* | 10/2017 | Green ..................... | H02M 1/32 |
| 2022/0021562 A1 | 1/2022 | Khan et al. | |

OTHER PUBLICATIONS

Examination Report for European Patent Application No. 23213122.
7, mailed Mar. 18, 2026, 8 pages.

* cited by examiner

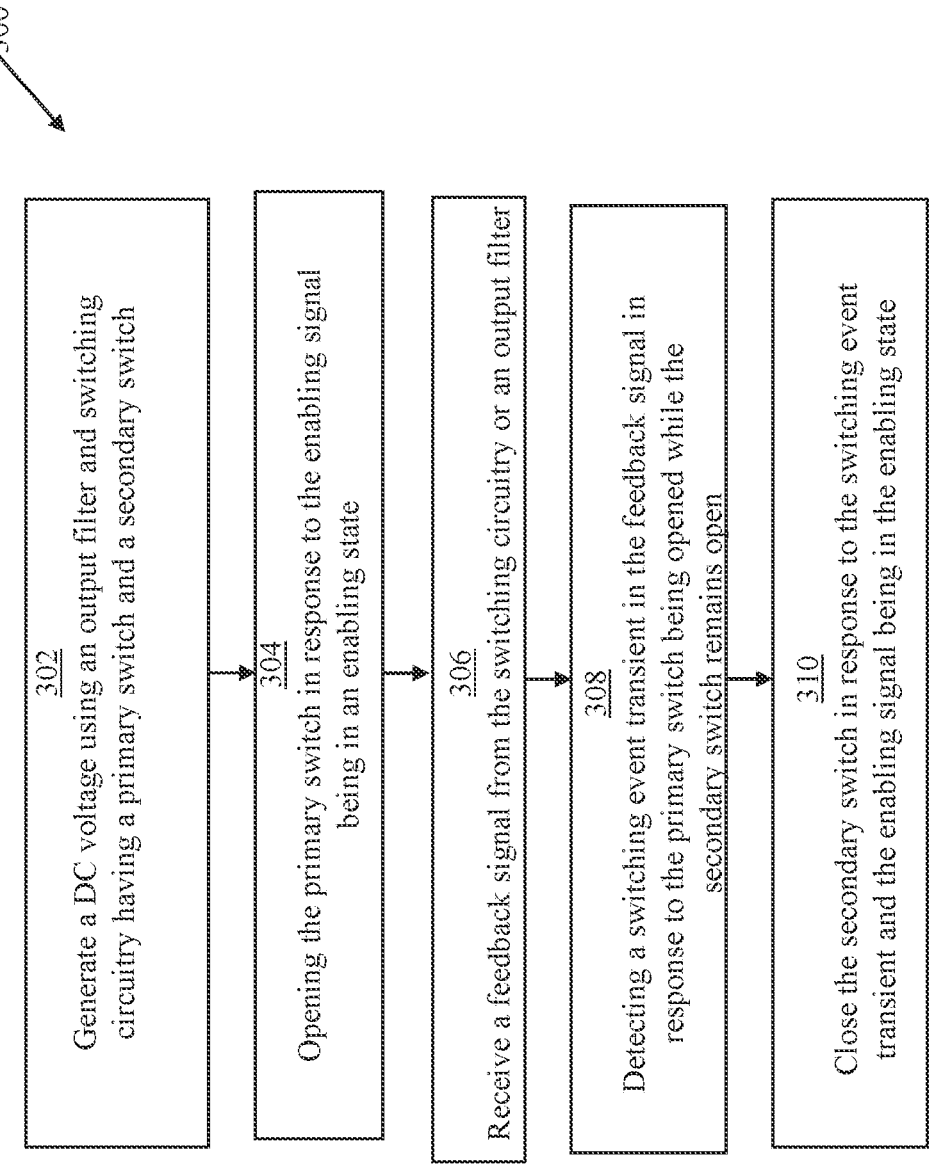

300

302
Generate a DC voltage using an output filter and switching circuitry having a primary switch and a secondary switch 304
Opening the primary switch in response to the enabling signal being in an enabling state 306
Receive a feedback signal from the switching circuitry or an output filter 308
Detecting a switching event transient in the feedback signal in response to the primary switch being opened while the secondary switch remains open 310
Close the secondary switch in response to the switching event transient and the enabling signal being in the enabling state

FIG. 3

ADAPTIVE DEAD-TIME CONTROL FOR SWITCHING CIRCUITRY OF A DC CONVERTER

RELATED APPLICATIONS

This application claims the benefit of provisional patent application Ser. No. 63/385,332, filed Nov. 29, 2022, the disclosure of which is hereby incorporated herein by reference in its entirety.

BACKGROUND

Switch converters are used to efficiently convert a DC input voltage at a first voltage level to a DC output voltage at a second voltage level. The switch converter does this by opening and closing a primary and a secondary switch and filtering the output of the switch converter with an output filter (usually an LC filter). To prevent the switch converter from causing a short circuit, the primary switch and the secondary switch should not be closed simultaneously. Thus, during any switch cycle, the primary switch and the secondary switch are both opened before closing the primary switch and opening the secondary switch or before opening the primary switch and closing the secondary switch. However, when both the primary switch and the secondary switch are both opened, the secondary switch operates a diode mode (using the body diode of the secondary switch). At high power levels, the current that flows through the body diode of the secondary switch consumes power and therefore creates inefficiencies.

SUMMARY

Embodiments of a switch converter are disclosed. In some embodiments, the switch converter includes switching circuitry, an output filter, a high-pass filter, switch control circuitry, and a trigger circuit. The switching circuitry includes a primary switch and a secondary switch connected in a half-bridge configuration. The output filter is connected to the switching circuitry. The switch control circuitry configured to control the opening and closing of the primary switch and the secondary switch so that the output filter generates a direct current (DC) voltage and generate an enabling signal in an enabling state in response to the primary switch being opened. The high-pass filter is configured to receive a feedback signal, wherein the high-pass filter is configured to filter out a switching transient edge in the feedback signal that is generated in response to the primary switch being open while the secondary switch stays open. The trigger circuit is configured to generate a trigger signal in an activation state in response to the transient edge and the enabling signal being in the enabling state. The switching circuitry is configured to close the secondary switch in response to the trigger signal being in the activation state.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 3 is a flow diagram illustrating a method of operating a switch converter, in accordance with some embodiments.

DETAILED DESCRIPTION

Figure 1A:
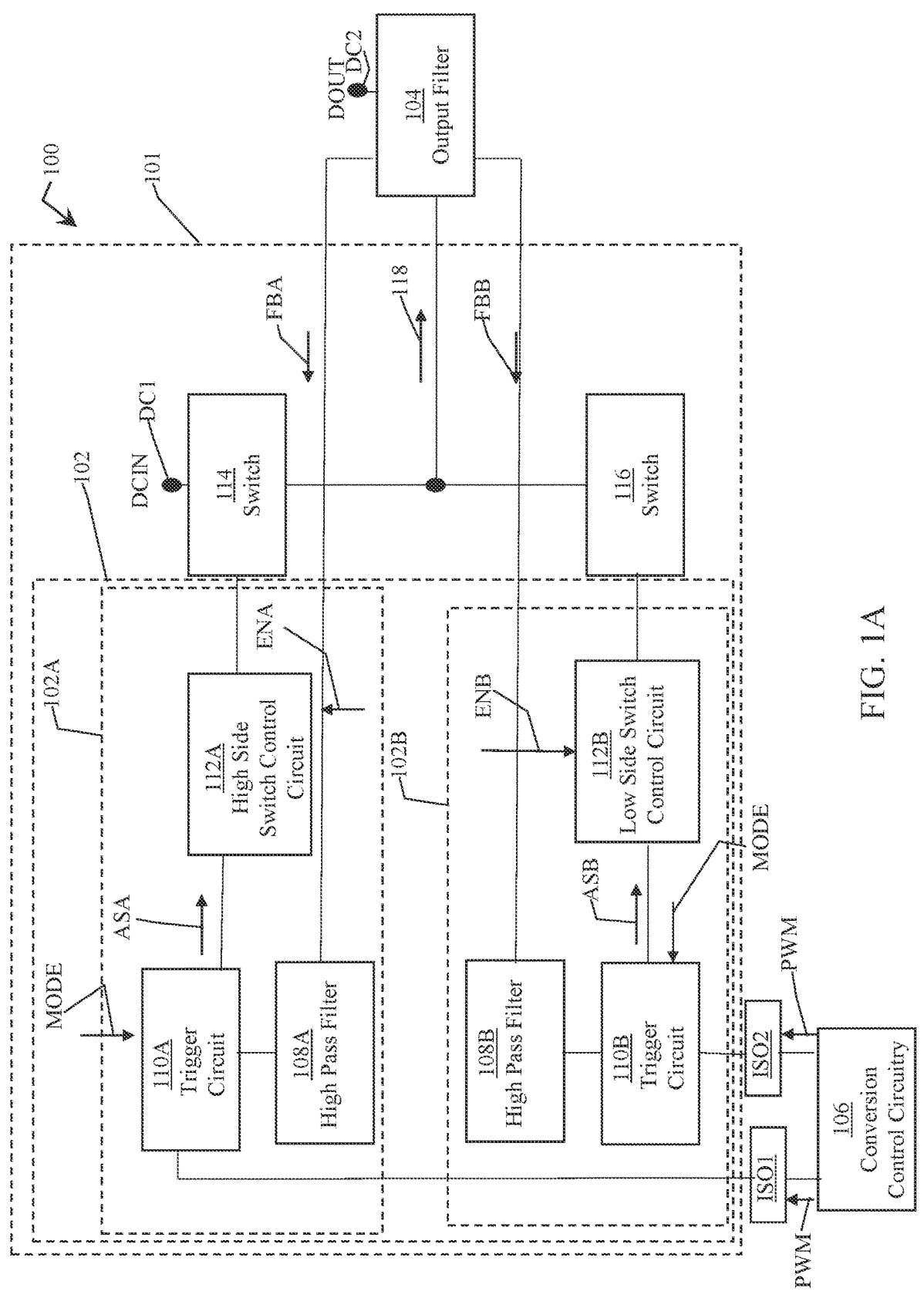
FIG. 1A is a block diagram of a switch converter, in accordance with some embodiments.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Embodiments of a switch converter are disclosed. The switch converter includes output filter coupled to switching circuitry and switch control circuitry for opening and closing the primary and secondary switch in the switching circuitry. To prevent a short circuit, the primary and the secondary switch are always both opened during a switching cycle. The switch control circuitry generates an enable signal in an enabled state once the primary switch has been opened, which indicates that the secondary switch is now ready to be closed. A high-pass filter filters a switching transient in a feedback signal that is generated in response to the primary switch getting open while the secondary switch stays open. A trigger circuit is configured to generate a trigger signal in an activation state in response to the switching transient and the enabling signal being in the enabling state. The switching circuitry is configured to close the secondary switch in response to the trigger signal being in the activation state. In a high voltage and high power system, there is a big propagation delay on signals across the primary switch, secondary switch and the switching control circuitry. This invention proposes the secondary switch to detect its turn ON timing without talking to the other blocks (the primary switch and the switching control circuitry). This allows for the secondary switch to be closed without having to wait for the switch control circuitry to close the switch. As a result, the secondary switch is closed sooner and therefore less power is wasted by the current through the body diode of the secondary switch.

FIG. 1A is a block diagram of a switch converter 100, in accordance with some embodiments.

The switch converter 100 is configured to receive a DC voltage DCIN and generate a DC voltage DCOUT. The DC voltage level of the DC voltage DCIN is different than the DC voltage level of the DC voltage DCOUT, in accordance with some embodiments. The DC voltage level of the DC voltage DCOUT depends on the configuration and manner of operating the switch converter 100.

The switch converter 100 includes a switching circuitry 101, an output filter 104, and a conversion control circuitry 106. The switching circuitry 101 includes a driver circuit 102, a switch 114, and a switch 116. The driver circuit 102 is configured to operate the switch 114 and the switch 116 so that the switch 114 and the switch 116 are opened (nonconducting state) and closed (conducting state). The conversion control circuitry 106 is configured to control the opening and closing of the switches 114, 116 so that the output filter 104 generates the DC voltage DCOUT. The driver circuit 102 includes a high side driver circuit 102A that is configured to generate a control voltage that opens and closes the switch 114. The driver circuit 102 also includes a low side driver circuit 102B that is configured to generate a control voltage that opens and closes the switch 116. The switch 114 is referred to as a high side switch. The switch 116 is referred to as the low side switch. In some embodiments, the switch 116 is connected to ground.

In FIG. 1A, the switching circuitry 102 is configured to operate in the buck configuration. As such, the DC input voltage DCIN is configured to be received at node DC1, which is connected to the power input (e.g., the drain when the switch 114 is an N-type FET) of the switch 114. Furthermore, the DC output voltage DCOUT is configured to be output at node DC2 connected to the output filter 104, (e.g., connected to a power inductor). In other embodiments, the switching circuitry 102 is in the boost configuration. In the boost configuration, the DC input voltage DCIN is received at DC2 (connected to the power inductor of the output filter 104) and output from the node DC1 (in the boost configuration, the node DC1 is connected to a shunt capacitor in the output filter 104).

The driver circuit 102 includes a high side gate driver circuit 102A that is configured to operate the opening and closing of the high side switch 114. The high side gate driver circuit 102A includes a high pass filter 108A, a trigger circuit 110A, and a high side switch control circuit 112A. The conversion control circuit 106 is configured to provide a pulse width modulated (PWM) signal PWM to the high side gate driver circuit 102A. An isolator ISO1 is provided to isolate the conversion control circuitry 106 and the high side gate driver circuit 102A. In some embodiments, the isolator ISO1 is a transformer. Once the PWM signal PWM is passed through the isolator ISO1, the PWM signal PWM becomes the enable signal ENA. The enable signal ENA is delayed with respect to the PWM signal PWM and has a different voltage and current level due to the isolator ISO1.

The driver circuit 102 includes a low side gate driver circuit 102B that is configured to operate the opening and closing of the low side switch 116. The low side gate driver circuit 102B includes a high pass filter 108B, a trigger circuit 110B, and a high side switch control circuit 112B. The conversion control circuit 106 is configured to provide a PWM signal PWM to the low side gate driver circuit 102B. An isolator ISO2 is provided to isolate the conversion control circuitry 106 and the low side gate driver circuit 102B. In some embodiments, the isolator ISO2 is a transformer. Once the PWM signal PWM is passed through the isolator ISO2, the PWM signal PWM becomes the enable signal ENB. The enable signal ENB is delayed with respect to the PWM signal PWM and has a different voltage and current level due to the isolator ISO2.

In some embodiments, the conversion control circuitry 106 is provided by a microcontroller unit (MCU). In some embodiments, the switch 114 is a field effect transistor (FET). In some embodiments, the switch 114 is an N-channel type FET (NFET). In some embodiments, the switch is an NFET for with a Silicon Carbide (SiC) type substrate or a Gallium Arsenide (GaN) substrate. In some embodiments, the switch 114 is a Junction-Gate FET (JFET). SiC and GaN are utilized in high voltage applications, such as applications where the DC voltage DCIN and DC voltage DCOUT have DC voltage levels greater or equal to 100 volts.

In some embodiments, the switch 116 is a FET. In some embodiments, the switch 116 is an NFET. In some embodiments, the switch is an NFET for with a SiC type substrate or a GaN substrate. In some embodiments, the switch 116 is a JFET. SiC and GaN are utilized in high voltage applications, such as applications where the DC voltage DCIN and DC voltage DCOUT have DC voltage levels greater or equal to 100 volts.

The conversion control circuitry 106 is configured to generate the PWM signal PWM that is configured to cause the driver circuit 102 to open and close the switch 114 and the switch 116. By opening and closing the switch 114 and the switch 116, a switching node voltage signal 118 is generated from the DC voltage DCIN, which is input into the output filter 104. The output filter 104 filters the switching node 118 to generate the DC voltage DCOUT. A duty cycle of the switching node 118 determines a DC voltage level of the DC voltage DCOUT. In this embodiment, a negative edge of the PWM signal PWM causes the high side gate driver circuit 102A to close the switch 114 and causes the low side gate driver circuit 102B to open the switch 116. In alternative embodiments, a positive edge of the PWM signal PWM causes the high side gate driver circuit 102A to open the switch 114 and causes the low side gate driver circuit 102B to close the switch 116. In this embodiment, a positive edge of the PWM signal PWM causes the high side gate driver circuit 102A to open the switch 114 and causes the low side gate driver circuit 102B to close the switch 116. In alternative embodiments, a negative edge of the PWM signal PWM causes the high side gate driver circuit 102A to close the switch 114 and causes the low side gate driver circuit 102B to open the switch 116.

The conversion control circuitry 106 cycles the switching circuitry 101 through various switching states in order to convert the DC voltage nodes DC1 and DC2. In the boost configuration, DC2 is the input (call it DCIN) and DC1 is the output (call it DCOUT). In the buck configuration, DC1 is the input (DCIN) and the DC2 is the output (DCOUT). In particular, in a first switching state, the primary switch is closed and the secondary switch is opened. In a second switching state, the primary switch is opened and the secondary switch is closed. If the switching circuitry 101 were perfectly synchronized, then the first switching state and the second switching state would be all that is necessary in order to convert the DC voltage DCIN to the DC voltage DCOUT. However, since perfect synchronization is not normally achievable, a third switching state is added always between switching from the first switching state to the second switching state or between second switching state and the first switching state. More specifically, both the primary switch and the secondary switch being open simultaneously is to be avoided in order to avoid the primary switch and the secondary switch conducting simultaneously, causing a short circuit. In the third switching state, both the primary switch and the secondary switch are opened. This ensures that the primary switch and secondary switch are never both closed when transitioning between the first switching state and the second switching state since the third switching state is always provided in between the first and second switching states.

In some embodiments, the switch 114, the switch 116, and the output filter 104 are configured as a boost converter (i.e., step-up DC to DC converter). In the boost converter configuration, the primary switch is the switch 116 while the switch 114 is the secondary switch. In the boost configuration, the switch 116 is connected in shunt with respect to a power inductor in the output filter 104. When both the switch 116 and the switch 114 are in the open state during the third switching state, the switch 114 operates as a diode in that a body diode in the switch 114 allows current to continue flowing. However, it is undesirable for the switch 114 to operate for long as a diode in high voltage operations due to the large voltage drop across the switch 114. Thus, it is desirable for the switch 114 to be turned on as soon as possible to avoid the wasteful consumption of power.

In some embodiments, the switch 114, the switch 116, and the output filter 104 are configured as a buck converter (i.e., step-down DC to DC converter). In the buck converter configuration, the primary switch is the switch 114 while switch 116 is the secondary switch. In the buck configuration, the switch 114 is connected in series with respect to an input voltage DC1 (i.e., DCIN). When both the switch 116 and the switch 114 are in the open state, the switch 116 operates as a diode in that a body diode in the switch 116 allows current to continue flowing from the power inductor in the output filter 104. However, it is undesirable for the switch 116 to operate for long in as a diode in high voltage operations due to the large voltage drop across the switch 116. Thus, it is desirable for the switch 116 to be turned on as soon as possible to end the third switching state to avoid the wasteful consumption of power. It should be noted that in some embodiments, the switching circuitry 101 is switchable to operate between the boost configuration and the buck configuration.

In the boost configuration, the switch 116 is the primary switch while the switch 114 is the secondary switch. The mode signal MODE has a first signal state to indicate the boost configuration and a second signal state to indicate the buck configuration. In the boost configuration, the mode signal MODE turns on the trigger circuit 110A and turns off the trigger circuit 110B. The enabling signal ENA is provided as the PWM signal PWM and is delayed by a phase determined by the isolator ISO1.

To avoid the wasteful consumption of power in the boost configuration, the high-pass filter 108A and the trigger circuit 110A operate to turn on the switch 114 (i.e., secondary switch in the boost configuration) sooner than the conversion control circuitry 106 would turn on the switch 114 with the PWM signal PWM. This is because the conversion control circuitry 106 and the output filter 104 are typically connected by the isolator ISO1 (e.g., a transformer), which slows down any feedback signal to the conversion control circuitry 106.

A feedback signal FBA is received from a node coupled to the output filter 104, from the driver circuit 102, or from a node connected to the switches 114, 116. The feedback signal FBA is received as the output of a power inductor in the output filter 104. As such, the feedback signal FBA will have a signal (either a negative or a positive transition edge) in response to both the switches 114, 116 being opened. The feedback signal FBA is indicative of the switching node signal 118 or a derivative of the switching node signal 118. The feedback signal FBA is thus indicative of which switch 114, 116 is to be opened by the driver circuit 102 and which switch 114, 116 is to be closed by the driver circuit 102. More specifically, in response to the switch 114 being opened, the feedback signal FBA has a switching transient event. The high pass filter 108A is configured to generate the feedback signal FBA so that the switching transient event is detected by the trigger circuit 110A. The isolator ISO1 isolates the conversion control circuit 106 from the high side switch control circuit 112A and the low side switch control circuit 112B but does not isolate the high pass filter 108A from the trigger circuit 110A.

The trigger circuit 110A is configured to generate a trigger signal ASA in an activation state in response to the switching event transient in the feedback signal FBA. The switching transient is caused by an edge of the switching node signal 118. In this embodiment, the trigger circuit 110A is configured to detect a positive edge in the boost configuration (as indicated by the mode signal MODE). In the boost configuration, the trigger signal ASA is in a detection state in response to a positive transition edge in the feedback signal FBA and in a non-detection state when the negative transition edge is not present in the feedback signal FBA.

In response to the switching event transient, the trigger signal ASA is switched from a deactivation state to an activation state. The high side switch control circuit 112A is configured to close the switch 114 in response to the transition (i.e., signal edge) of the trigger signal ASA going from the deactivation state to the activation state. Since the isolator ISO1 is not in the feedback loop, the switch 114 is closed faster and therefore less power is consumed.

In the buck configuration, the switch 114 is the primary switch while the switch 116 is the secondary switch. The mode signal MODE has the first signal state to indicate the boost configuration and the second signal state to indicate the buck configuration. In the buck configuration, the mode signal MODE turns on the trigger circuit 110B and turns off the trigger circuit 110A. The enabling signal ENB is provided as the PWM signal PWM and is delayed by a phase determined by the isolator ISO2 in addition to a phase shift of 180 degrees.

To avoid the wasteful consumption of power in the buck configuration, the high pass filter 108B and the trigger circuit 110B operate to turn on the switch 114 (i.e., secondary switch in the buck configuration) sooner than the conversion control circuitry 106 would turn on the switch 114 with the PWM signal PWM. This is because the conversion control circuitry 106 and the output filter 104 are typically connected by the isolator ISO2 (e.g., a transformer), which slows down any feedback signal to the conversion control circuitry 106.

A feedback signal FBB is received from a node coupled to the output filter 104, from the driver circuit 102, or from a node connected to the switches 114, 116. The feedback signal FBB is received as the output of a power inductor in the output filter 104. As such, the feedback signal FBB will have a signal (either a negative or a positive transition edge) in response to both the switches 114, 116 being opened. The feedback signal FBB is indicative of the switching node signal 118 or a derivative of the switching node signal 118. The feedback signal FBB is thus indicative of which switch 114, 116 is to be opened by the driver circuit 102 and which switch 114, 116 is to be closed by the driver circuit 102. More specifically, in response to the switch 114 being opened, the feedback signal FBB has a switching transient event. The high pass filter 108B is configured to generate the feedback signal FBB so that the switching transient event is detected by the trigger circuit 110B. The isolator ISO2 isolates the conversion control circuit 106 from the high side switch control circuit 112A and the low side switch control circuit 112B but does not isolate the high pass filter 108B from the trigger circuit 110B.

The trigger circuit 110B is configured to generate a trigger signal ASB in an activation state in response to the switching event transient in the feedback signal FBB. The switching transient is caused by an edge of the switching node signal 118. In this embodiment, the trigger circuit 110B is configured to detect a negative edge in the buck configuration (as indicated by the mode signal MODE). In the buck configuration, the trigger signal ASB is in a detection state in response to a negative transition edge in the feedback signal FBB and in a non-detection state when the negative transition edge is not present in the feedback signal FBB.

In response to the switching event transient, the trigger signal ASB is switched from a deactivation state to an activation state. The low side switch control circuit 112B is configured to close the switch 116 in response to the transition (i.e., signal edge) of the trigger signal ASB going from the deactivation state to the activation state. Since the isolator ISO2 is not in the feedback loop, the switch 116 is closed faster and therefore less power is consumed.

Figure 1B:
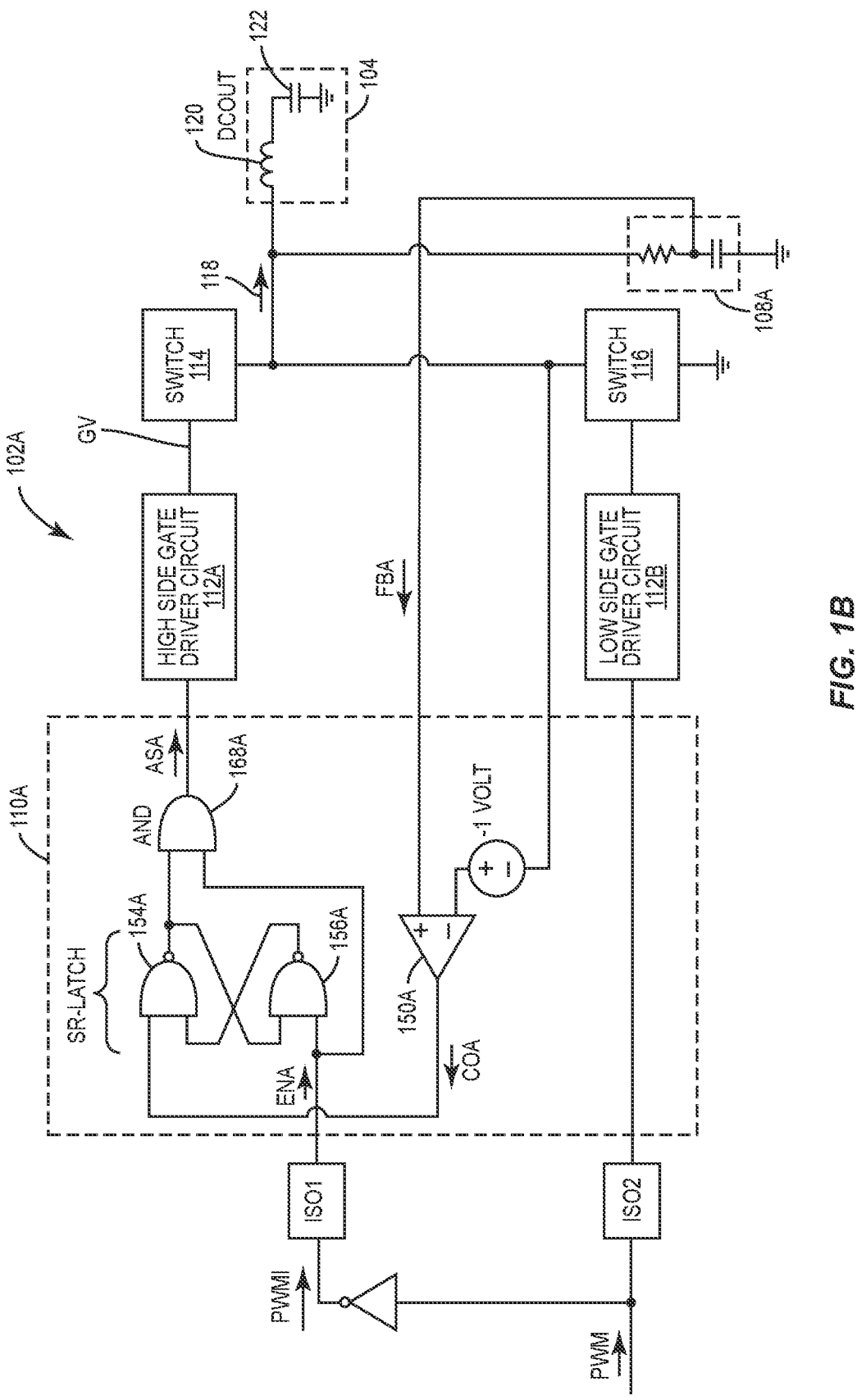
FIG. 1B and FIG. 1C are simplified block diagrams of the driver circuit, the switch, and the switch of FIG. 1A in the boost configuration, in accordance with some embodiments.
Figure 1C:
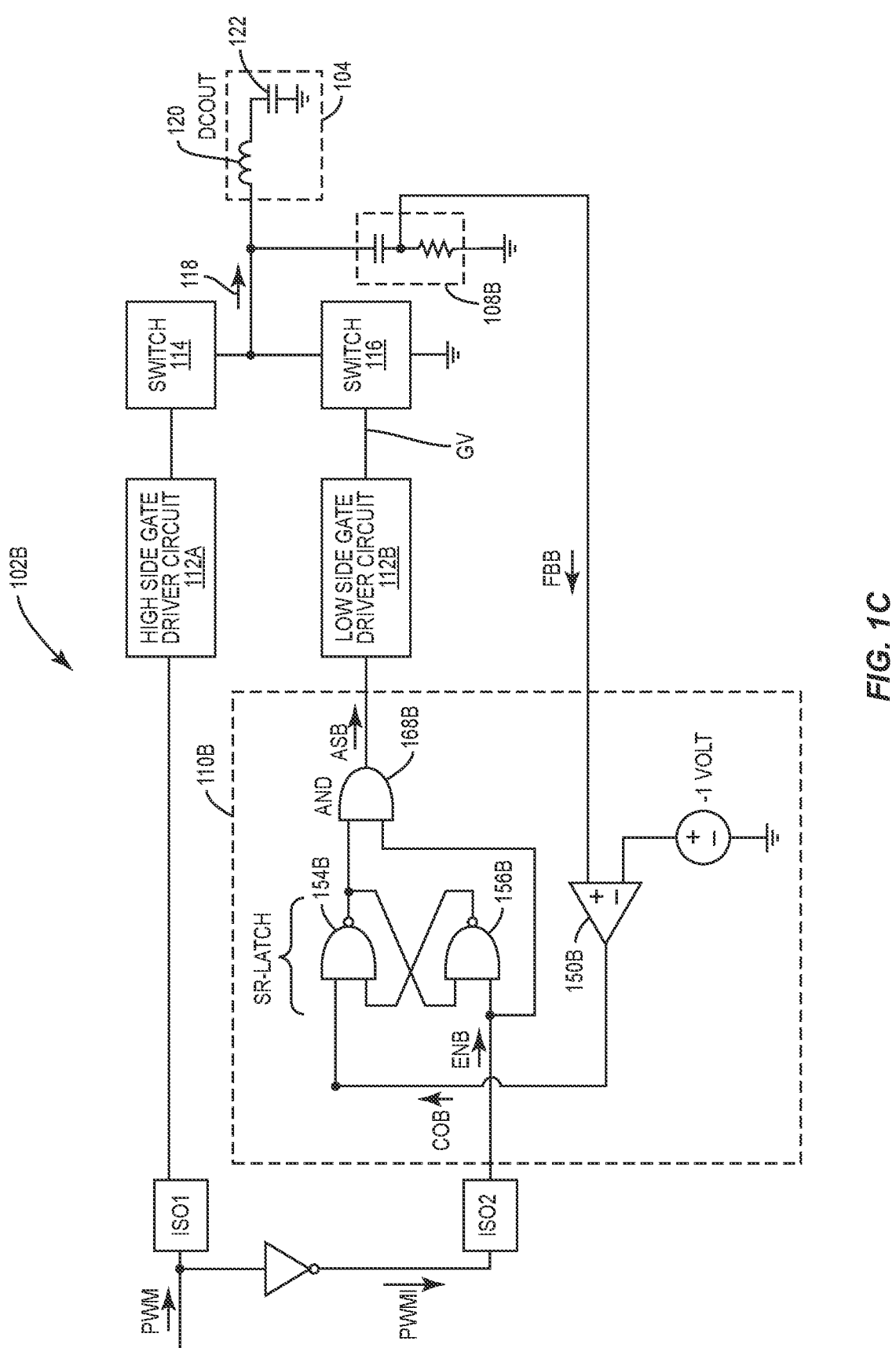

FIG. 1B and FIG. 1C are simplified block diagrams of the driver circuit 102, the switch 114, and the switch 116 of FIG. 1A in the boost configuration, in accordance with some embodiments.

In the boost configuration, as shown in FIG. 1B, the logic 110A routes the trigger signal ASA to the high side driver circuit 112A since the switch 114 is the secondary switch. The logic 110A also routes the PWM signal PWM to the high side driver circuit 112A and the low side gate driver circuit 112B. In some embodiments, the logic 110A sends an inverted version of the PWM signal PWM to the high side gate driver circuit 112A and a non-inverted version of the PWM signal PWM to the low side gate driver circuit 112B.

The trigger signal ASA is in the activation state in response to the main switch (i.e., the switch 116 in the boost configuration) being opened. Thus, the switch 114 is ready to be opened and the trigger signal ASA is generated in the activation state. In response to the activation state of the trigger signal ASA, the switch 114 goes from being opened to being closed.

In the buck configuration, as shown in FIG. 1C, the logic 110B routes the trigger signal ASB to the low side driver circuit 112B since the switch 116 is the secondary switch. The logic 110B also routes the PWM signal PWM to the high side driver circuit 112A and the low side gate driver circuit 112B. In some embodiments, the logic 110B sends a non-inverted version of the PWM signal PWM to the high side gate driver circuit 112A and an inverted version of the PWM signal PWM to the low side gate driver circuit 112B.

The trigger signal ASB is in the activation state in response to the main switch (i.e., the switch 114 in the buck configuration) being opened. Thus, the switch 116 is ready to be opened and the trigger signal ASB is generated in the activation state. In response to the activation state of the trigger signal ASB, the switch 116 goes from being opened to being closed.

Figure 1D:
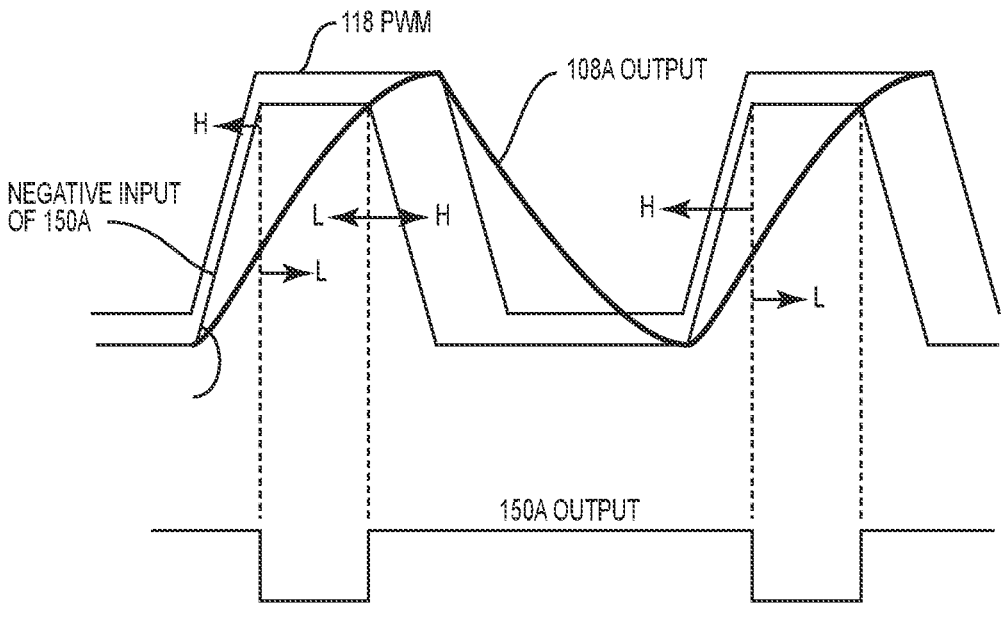
FIG. 1D is a signal diagram for the trigger circuit in FIG. 1B, in accordance with some embodiments.
Figure 1E:
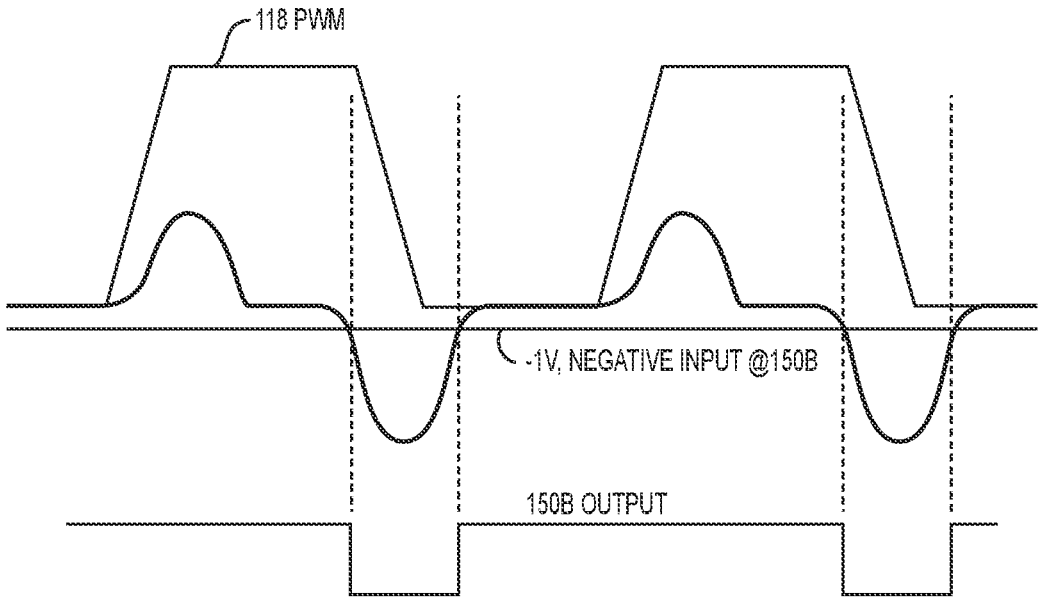
FIG. 1E is a signal diagram for the trigger circuit in FIG. 1C, in accordance with some embodiments.

FIG. 1B and FIG. 1C are a simplified block diagram of a trigger circuits 110A, 110B in the boost configuration and the buck configuration, in accordance with some embodiments. FIG. 1D is a signal diagram for the trigger circuit 110A in FIG. 1A, in accordance with some embodiments. FIG. 1E is a signal diagram for the trigger circuit 110B in FIG. 1B, in accordance with some embodiments.

FIG. 1B illustrates an embodiment of the high side driver circuit 102A, in accordance with some embodiments.

The high side driver circuit 102A illustrates an embodiment of the trigger circuit 110A. The trigger circuit 110A includes a comparator 150A, NAND gate 154A, a NAND gate 156A, and an AND gate 168A. The output filter 104 is shown as having a power inductor 120 and a capacitor 122. In this embodiment, the feedback signal FBA is feedback of the PWM signal 118 generated from the switches 114, 116, as explained above. The high-pass filter 108A is a series connected capacitor and resistor, where the feedback signal FBA is generated at the intermediary node between the capacitor and resistor. In this embodiment, the feedback signal FBA is a feedback voltage. Once filtered by the high-pass filter 108A, the feedback signal FBA has a feedback signal level set in accordance with a derivative of the voltage of the PWM signal 118, as shown in FIG. 1D.

With regards to the comparator 150A in the boost configuration, an inverting terminal of the comparator 150A is configured to receive the feedback signal FBA. In the boost configuration, the non-inverting terminal receives a DC reference voltage having a DC voltage level of –1 Volts with respect to the PWM signal 118. As such, the comparator 150A generates a comparator output COA in the high voltage state in response to the feedback signal FBA having a negative polarity with a magnitude greater than 1 Volt. Otherwise, the comparator output COA of the comparator 150A is in the high voltage state. Thus, the comparator 150A detects the negative voltage spikes in the feedback signal FBA, which corresponds to the positive edges of the PWM signal 118.

One input terminal of the NAND gate 154A receives the output of the comparator 150A. The other input terminal of the NAND gate 154A receives an output of the NAND gate 156A. One input terminal of the NAND gate 156A is configured to receive an inversion of the PWM signal PWM, where the inversion is referred to as the signal PWMI. The other input terminal of the NAND gate 156A is connected to receive an output of the NAND gate 154A. Thus, the NAND gate 154A and the NAND gate 156A form an SR latch. The non-inverting output of the SR latch (the output of the NAND gate 154A) is received at one input terminal of the AND gate 168A and the other input terminal of the AND gate 168A receives inverted PWM signal PWMI. The inverted PWM signal PWMI is passed through the isolator ISO1 to become the enable signal ENA.

Without the negative spikes NE, the output of the comparator 150A is maintained in the high voltage state. While the PWM signal 118 is in the high voltage state (where switch 116 is closed), the PWMI signal stays in the low voltage state and forces the output from the SR latch from the AND gate 154A to be in the low voltage state. Also, the PWMI signal in the low voltage state makes the AND gate 168A to maintain the output in the low voltage state. During this condition, the signal ASA stays in the low voltage state and the switch 114 is forced open. Once the PWM signal 118 goes into the low voltage state, the PWMI signal goes into the high voltage state. With the PWMI signal in the high voltage state, the SR latch is in "hold" mode and maintains the previous low voltage output state. The SR latch waits for the low voltage state output from the comparator 150A. Upon a positive transient event of the PWM signal 118, the output COA of the comparator 150A generated in the low voltage state and the output of the SR latch from the AND 154A output goes into the high voltage state. As the PWMI is in the high voltage state, the AND 168A receives a low voltage output transition from the SR latch. This way, the trigger circuit 110A triggers generates the trigger signal in the activation state to close the switch 114. The switch 114 is thus closed without a signal goes having to pass through isolators ISO1, ISO2 or any other time consuming isolator.

FIG. 1C illustrates an embodiment of the low side driver circuit 102B, in accordance with some embodiments.

The low side driver circuit 102A illustrates an embodiment of the trigger circuit 110A. The trigger circuit 110A includes a comparator 150B, NAND gate 154B, a NAND gate 156B, and an AND gate 168B. In this embodiment, the feedback signal FBB is feedback of the PWM signal 118 generated from the switches 114, 116, as explained above. The high-pass filter 108B is a series connected capacitor and resistor, where the feedback signal FBA is generated at the intermediary node between the capacitor and resistor. In this embodiment, the feedback signal FBB is a feedback voltage. Once filtered by the high-pass filter 108B, the feedback signal FBB has a feedback signal level set in accordance with a derivative of the voltage of the PWM signal 118, as shown in FIG. 1E.

With regards to the comparator 150B in the buck configuration, an inverting terminal of the comparator 150B is configured to receive the feedback signal FBB. In the buck configuration, the non-inverting terminal receives a DC reference voltage having a DC voltage level of –1 Volts. As such, the comparator 150B generates a comparator output COB in the high voltage state in response to the feedback signal FBB having a negative polarity with a magnitude greater than –1 Volt. Otherwise, the comparator output COB of the comparator 150B is in the high voltage state. Thus, the comparator 150B detects the negative voltage spikes in the feedback signal FBB, which corresponds to the negative edges of the PWM signal 118.

One input terminal of the NAND gate 154B receives the output COB of the comparator 150B. The other input terminal of the NAND gate 154B receives an output of the NAND gate 156B. One input terminal of the NAND gate 156B is configured to receive the enable signal ENB. The other input terminal of the NAND gate 156A is connected to receive an output of the NAND gate 154A. Thus, the NAND gate 154A and the NAND gate 156A form an SR latch. The non-inverting output of the SR latch (the output of the NAND gate 154B) is received at one input terminal of the AND gate 168A and the other input terminal of the AND gate 168A receives the enable signal ENB. The PWM signal PWM is passed through the isolator ISO2 to become the enable signal ENB.

Without the positive spikes, the output COB of the comparator 150A is maintained in the high voltage state. While the PWM signal 118 is in the low voltage state (where the switch 114 is closed), the enable signal ENB stays in the low voltage state and forces the output from the SR latch from the AND gate 154A to be in the low voltage state. Also, the enable signal ENB in the low voltage state forces the AND gate 168A to maintain the output in the low voltage state. During this condition, the signal ASB stays in the low voltage state and the switch 116 is forced open. Once the PWM signal 118 goes into the high voltage state, the enable signal ENB goes into the high voltage state. With the enable signal ENB in the high voltage state, the SR latch is in "hold" mode and maintains the previous low voltage output state. The SR latch waits for the low voltage state output from the comparator 150A. Upon a transient event of the PWM signal 118, the output COB of the comparator 150A generated in the low voltage state and the output of the SR latch from the AND 154A output goes into the high voltage state. As the enable signal ENB is in the high voltage state, the AND 168A receives a low voltage output transition from the SR latch. This way, the trigger circuit 110B triggers generates the trigger signal ASB in the activation state to close the switch 116. The switch 116 is thus closed without a signal goes having to pass through isolators ISO1, ISO2 or any other time consuming isolator.

Figure 2:
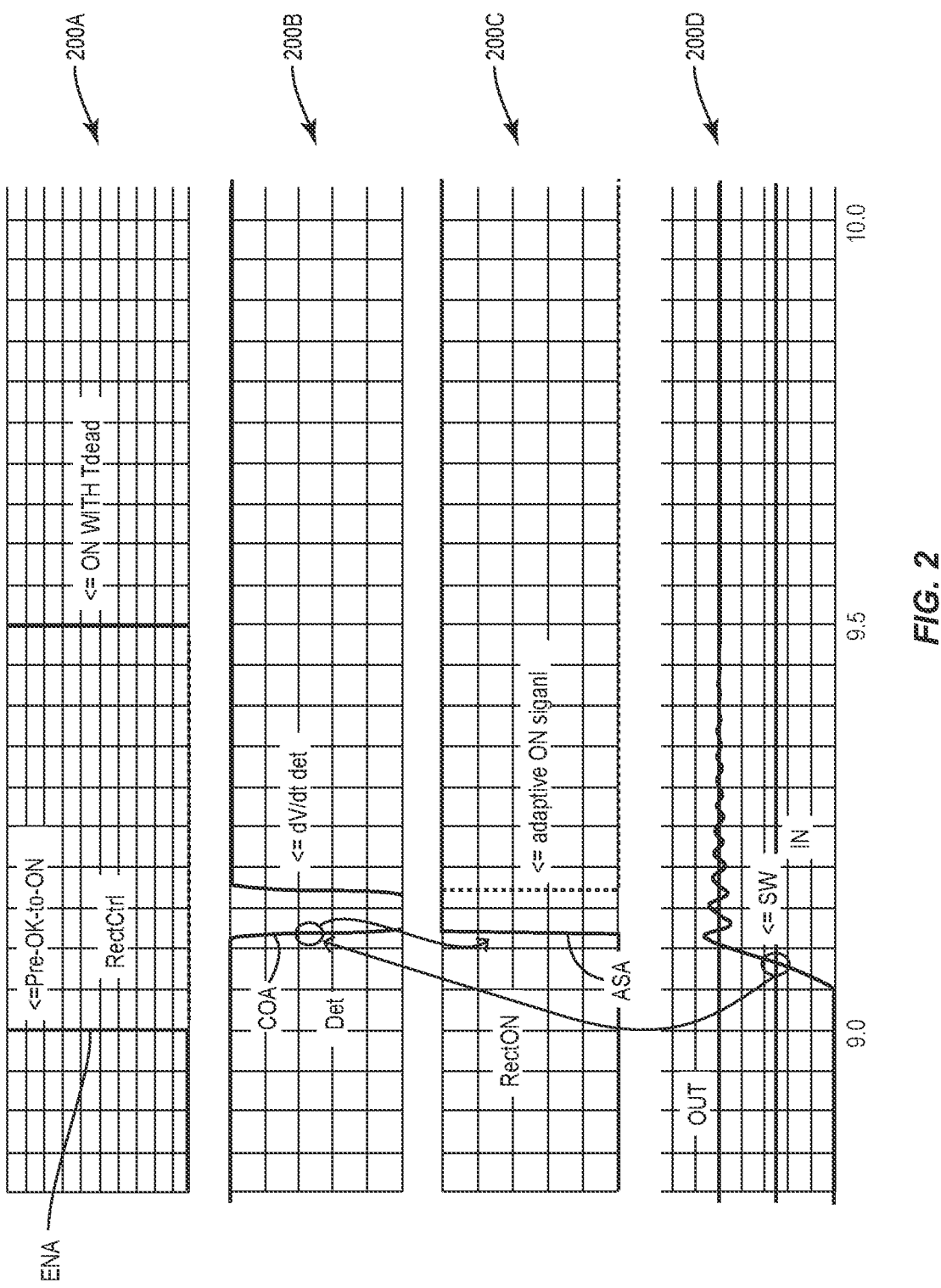
FIG. 2 illustrates voltage waveforms that demonstrate the operation of a high-pass filter and a trigger circuit, in accordance with some embodiments.

FIG. 2 illustrates voltage waveforms that demonstrate the operation of a high-pass filter and a trigger circuit.

In some embodiments, the high-pass filter is the RC filter 108A in FIG. 1B and the trigger circuit is the trigger circuit 110A in FIG. 1B. In some embodiments, the high-pass filter is the RC filter 108B in FIG. 1C and the trigger circuit is the trigger circuit 110B in FIG. 1C. A voltage diagram 200A is a voltage waveform illustrating the voltage level of the PWM signal. A voltage waveform 200B is a voltage level at the output COA of the comparator 150A in the trigger circuit (e.g., comparator 150A in trigger circuit 110A in FIG. 1B versus time. A voltage waveform 200C is a voltage diagram of the voltage level of the trigger signal ASA versus time. A voltage waveform 200D illustrates the voltage level at the switching node 118.

As shown in the voltage diagram 200A, at 9 picoseconds, the enable signal ENA goes from the disabled state to the enabled state. At 9.12 picoseconds, the switching transition is detected in the feedback signal by the comparator output COA. As a result, at 9.13 picoseconds, the trigger signal ASA goes from the deactivation state to the activation state. At 914 ps, the gate voltage of the secondary switch is pulled to the DC output voltage VOUT. The voltage diagrams 200A-200D also show that if the trigger circuit 110A and the high-pass filter 108A were not provided, the gate voltage of the secondary switch would not turn on until approximately 9.55 ps.

FIG. 3 is a flow diagram 300 illustrating a method of operating a switch converter, in accordance with some embodiments.

In some embodiments, the flow diagram 300 is performed by the switch converter 100 in FIG. 1A. The flow diagram includes blocks 302-310. Flow begins at the block 302.

At the block 302, a DC voltage is generated using an output filter and switching circuitry having a primary switch and a secondary switch. In some embodiments, the DC voltage is the DC voltage DCOUT in FIG. 1A. In some embodiments, the output filter is the output filter 104 in FIG. 1A. An example of the switching circuitry is the switching circuitry 101 in FIG. 1A. In some embodiments, the primary switch is the switch 114 (i.e., in the buck configuration) or the switch 116 (i.e., in the boost configuration) of FIG. 1A. Flow then proceeds to the block 304.

At the block 304, the primary switch is opened in response to the enabling signal being in an enabling state. In some embodiments, the switch control circuitry of FIG. 1A generates the enabling signal. Examples of the enabling signal are the enabling signal ENA and the enabling signal ENB in FIG. 1A. Flow then proceeds to the block 306.

At the block 306, a feedback signal is received from the switching circuitry or the output filter. Examples of the feedback signal are the feedback signal FBA and the feedback signal FBB in FIG. 1A. Flow then proceeds to block 308.

At the block 308, a switching event transient is detected in response to the primary switch being opened while the secondary switch remains open. In some embodiments, the signal spike is filtered by the high-pass filter 108A and the high-pass filter 108B in FIG. 1A, 1B, 1C. Flow then proceeds to the block 310.

At the block 310, the secondary switch is closed in response to the switching transient and the enabling signal being in the enabling state. In some embodiments, the secondary switch is the switch 114 (i.e., in the boost configuration) or the switch 116 (i.e., in the buck configuration) of FIG. 1A.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A switch-mode power converter, comprising:

switching circuitry that includes a primary switch and a secondary switch connected in a half-bridge configuration;

an output filter connected to the switching circuitry at a node between the primary switch and the secondary switch;

a primary switch control circuit configured to control the opening and closing of the primary switch;

a secondary switch control circuit configured to control the opening and closing of the secondary switch;

a conversion control circuit configured to generate a pulse width modulated (PWM) signal and output the PWM signal to one or more isolators so that the PWM signal becomes an enabling signal once the PWM signal passes through the one or more isolators such that the enabling signal is output to the primary switch control circuit so that the output filter generates a direct current (DC) voltage from the switching circuitry;

a high-pass filter coupled to the switching circuitry or the output filter to generate a feedback signal, wherein a switch transient event is provided in the feedback signal in response to the opening of the primary switch;

a trigger circuit configured to receive the feedback signal from the high-pass filter and configured to switch a trigger signal from a first signal state to a second signal state in response to the switch transient event, wherein the secondary switch control circuit is configured to close the secondary switch in response to the trigger signal transitioning from the first signal state to the second signal state; and the one or more isolators wherein the one or more isolators isolate the conversion control circuit from the primary switch control circuit and the secondary switch control circuit but do not isolate the high-pass filter from the trigger circuit such that the enabling signal is delayed with respect to the PWM signal due to the one or more isolators but the feedback signal is not delayed by the one or more isolators.

2. The switch-mode power converter of claim 1, wherein the primary switch is a high side switch and the secondary switch is a low side switch.

3. The switch-mode power converter of claim 1, wherein the primary switch is a low side switch and the secondary switch is a high side switch.

4. The switch-mode power converter of claim 1, wherein the trigger circuit comprises a comparator.

5. The switch-mode power converter of claim 4, wherein:

an inverting terminal of the comparator is configured to receive the feedback signal;

a non-inverting terminal of the comparator receives a DC reference voltage having a DC voltage level; and the comparator generates a comparator output in a high voltage state in response to the feedback signal having a first polarity.

6. The switch-mode power converter of claim 5, wherein the trigger circuit further comprises an SR latch and wherein:

a first input terminal of the SR latch receives the comparator output of the comparator; and a second input terminal of the SR latch receives an enable signal indicative of the PWM signal.

7. The switch-mode power converter of claim 6, wherein the trigger circuit further comprises an AND gate, wherein:

a first input terminal of the AND gate receives an output of the SR latch;

a second input terminal of the AND gate receives the enable signal; and the AND gate is configured to generate the trigger signal.

8. The switch-mode power converter of claim 1, wherein the trigger circuit is configured to provide the trigger signal, which is configured to close the secondary switch in response to the trigger signal being in an activation state.

9. The switch-mode power converter of claim 1, wherein the one or more isolators comprise a transformer.

10. The switch-mode power converter of claim 1, wherein the switch-mode power converter is in a boost configuration.

11. The switch-mode power converter of claim 1, wherein the switch-mode power converter is in a buck configuration.

12. A switching converter, comprising:

switching circuitry configured to receive a first direct current (DC) voltage, the switching circuitry including a primary switch and a secondary switch connected in a half-bridge configuration;

pass a pulse width modulated (PWM) signal through an isolator to become an enabling signal that is delayed with respect to the PWM signal due to passing through the isolator;

a first output filter connected to the switching circuitry, wherein the switching circuitry is configured to open and close the primary switch and the secondary switch in accordance to the enabling signal such that the first output filter generates a second DC voltage from the first DC voltage;

a high-pass filter coupled to the switching circuitry or the first output filter to generate a feedback signal, wherein a switch transient event is provided in the feedback signal in response to the opening of the primary switch;

a trigger circuit configured to receive the feedback signal from the high-pass filter and configured to switch a trigger signal from a first signal state to a second signal state in response to a switch transient event, wherein the switching circuitry is configured to close the secondary switch in response to the trigger signal transitioning from the first signal state to the second signal state; and wherein no isolators are provided between the trigger circuit and the switching circuitry.

13. The switching converter of claim 12, the switching circuitry comprising:

the primary switch as a high side switch; and the secondary switch as a low side switch.

14. The switching converter of claim 12, the switching circuitry comprising:

the primary switch as a low side switch; and the secondary switch as a high side switch.

15. The switching converter of claim 12, wherein the trigger circuit comprises a comparator.

16. The switching converter of claim 15, wherein:

an inverting terminal of the comparator is configured to receive the feedback signal;

a non-inverting terminal of the comparator receives a DC reference voltage having a DC voltage level; and the comparator generates a comparator output in a high voltage state in response to the feedback signal having a first polarity.

17. The switching converter of claim 16, wherein the trigger circuit further comprises an SR latch and wherein:

a first input terminal of the SR latch receives the comparator output of the comparator; and a second input terminal of the SR latch receives an enable signal indicative of the PWM signal.

18. The switching converter of claim 17, wherein the trigger circuit further comprises an AND gate, wherein:

a first input terminal of the AND gate receives an output of the SR latch; a second input terminal of the AND gate receives the enable signal; and the AND gate is configured to generate the trigger signal.

19. The switching converter of claim 12, wherein, in a first mode, the switching converter operates in a boost configuration and in a second mode the switching converter operates in a buck configuration.

20. A method of operating a switch converter, comprising:

generating a direct current (DC) voltage using an output filter and switching circuitry, the switching circuitry comprising a primary switch and a secondary switch;

delaying a pulse width modulation (PWM) signal with an isolator so that the PWM signal becomes an enabling signal;

opening the primary switch in response to an enabling signal being in an enabling state;

receiving a feedback signal from the switching circuitry or the output filter, where the feedback signal does not pass through the isolator;

detecting a switching transient event in the feedback signal in response to the primary switch being opened while the secondary switch remains open; and closing the secondary switch in response to the switching transient event and the enabling signal being in the enabling state.

* * * * *